United States Patent
Tober et al.

(10) Patent No.: US 10,289,740 B2
(45) Date of Patent: May 14, 2019

(54) COMPUTER SYSTEMS TO OUTLINE SEARCH CONTENT AND RELATED METHODS THEREFOR

(71) Applicant: Searchmetrics GmbH, Berlin (DE)

(72) Inventors: Marcus Tober, Berlin (DE); Stephan Sommer-Schulz, Falkensee (DE); Isabeau Premont-Schwarz, Berlin (DE)

(73) Assignee: SEARCHMETRICS GMBH, Berlin (DE)

( * ) Notice: Subject to any disclaimer, the term of this patent is extended or adjusted under 35 U.S.C. 154(b) by 785 days.

(21) Appl. No.: 14/864,385

(22) Filed: Sep. 24, 2015

(65) Prior Publication Data

US 2017/0091331 A1 Mar. 30, 2017

(51) Int. Cl.
*G06F 17/30* (2006.01)

(52) U.S. Cl.
CPC .... *G06F 17/30867* (2013.01); *G06F 17/3053* (2013.01); *G06F 17/30598* (2013.01)

(58) Field of Classification Search
CPC ........... G06F 30/3053; G06F 30/30867; G06F 30/30598; G06F 17/3053; G06F 17/30867; G06F 17/30598
See application file for complete search history.

(56) References Cited

U.S. PATENT DOCUMENTS

| | | | |
|---|---|---|---|
| 6,721,713 B1 * | 4/2004 | Guheen | G06Q 50/01 705/1.1 |
| 8,041,733 B2 * | 10/2011 | Rouhani-Kalleh | G06F 17/30646 707/763 |
| 8,280,888 B1 | 10/2012 | Bierner et al. | |
| 8,606,800 B2 | 12/2013 | Lagad et al. | |
| 8,775,431 B2 | 7/2014 | Jason | |
| 9,058,332 B1 * | 6/2015 | Darby | G06F 17/3005 |
| 9,058,406 B2 * | 6/2015 | Soroca | G06Q 30/0247 |
| 9,213,771 B2 * | 12/2015 | Chen | G06F 17/30654 |
| 2003/0101153 A1 * | 5/2003 | Francis | G06F 17/30654 706/47 |
| 2003/0212541 A1 | 11/2003 | Kinder | |

(Continued)

*Primary Examiner* — Kris E Mackes
*Assistant Examiner* — Tiffany Thuy Bui
(74) *Attorney, Agent, or Firm* — Bryan Cave Leighton Paisner LLP

(57) ABSTRACT

Some embodiments include a system. The system comprises an input device, an output device, one or more processing modules, and one or more non-transitory memory storage modules storing computer instructions. The non-transitory memory storage module(s) are configured to run on the processing module(s) and perform acts of: receiving a search query; and responsive to receiving the search query: identifying a restricted group of questions, the questions of the restricted group of questions being relevant to the search query; transforming the restricted group of questions into a first group of questions and a second group of questions, the questions of the restricted group of questions comprising the questions of the first group of questions and the questions of the second group of questions; and communicating to a user the first group of questions and the second group of questions. Other embodiments of related systems and methods are also provided.

20 Claims, 7 Drawing Sheets

(56) References Cited

U.S. PATENT DOCUMENTS

| | | | |
|---|---|---|---|
| 2004/0030556 A1* | 2/2004 | Bennett | G06F 17/27 704/270 |
| 2005/0266387 A1* | 12/2005 | Rossides | G09B 7/00 434/323 |
| 2006/0117002 A1 | 6/2006 | Swen | |
| 2007/0022109 A1* | 1/2007 | Imielinski | G06F 17/30401 707/E17.068 |
| 2007/0192168 A1* | 8/2007 | Van Luchene | G06F 17/30646 705/14.54 |
| 2009/0112828 A1* | 4/2009 | Rozenblatt | G06F 17/30672 707/999.004 |
| 2009/0319555 A1 | 12/2009 | Ragno et al. | |
| 2010/0030763 A1 | 2/2010 | Chi et al. | |
| 2010/0042910 A1 | 2/2010 | Manolescu et al. | |
| 2010/0114924 A1 | 5/2010 | Zeidman et al. | |
| 2010/0145976 A1* | 6/2010 | Higgins | G06F 17/3064 707/765 |
| 2011/0010386 A1* | 1/2011 | Zeinfeld | G06Q 10/00 707/769 |
| 2011/0106617 A1* | 5/2011 | Cooper | G06Q 30/02 705/14.49 |
| 2011/0219295 A1 | 9/2011 | Adams et al. | |
| 2011/0225159 A1 | 9/2011 | Murray | |
| 2012/0059816 A1* | 3/2012 | Narayanan | G06F 17/30693 707/710 |
| 2012/0297294 A1 | 11/2012 | Scott et al. | |
| 2013/0144890 A1* | 6/2013 | Liu | G06Q 10/10 707/749 |
| 2014/0289231 A1 | 9/2014 | Palmert | |
| 2017/0032251 A1* | 2/2017 | Podgorny | G06N 5/022 |
| 2017/0242915 A1* | 8/2017 | Torisawa | G06F 17/30654 |

\* cited by examiner

COMPUTER SYSTEMS TO OUTLINE SEARCH CONTENT AND RELATED METHODS THEREFOR

TECHNICAL FIELD

This disclosure relates generally to systems to outline search content, and relates more particularly to computer systems to outline search content in multiple groups to facilitate navigation, review, and understanding of the search content and related methods.

BACKGROUND

With the amount of search content available steadily increasing, it is also becoming increasingly more difficult to navigate, review, and understand search content in a meaningful way. For example, the quantity of items of search content and/or the size of the items of search content can make difficult determining the search content that is most relevant to a particular topic of interest and/or whether certain relevant search content is more relevant to the topic of interest than other relevant search content. Indeed, the quantity of items of search content and/or the size of the items of search content may prohibit even reviewing many items of search content. Accordingly, there is a need for systems and methods to outline search content to facilitate navigation, review, and understanding of the search content.

BRIEF DESCRIPTION OF THE DRAWINGS

To facilitate further description of the embodiments, the following drawings are provided in which.

Figure 1:
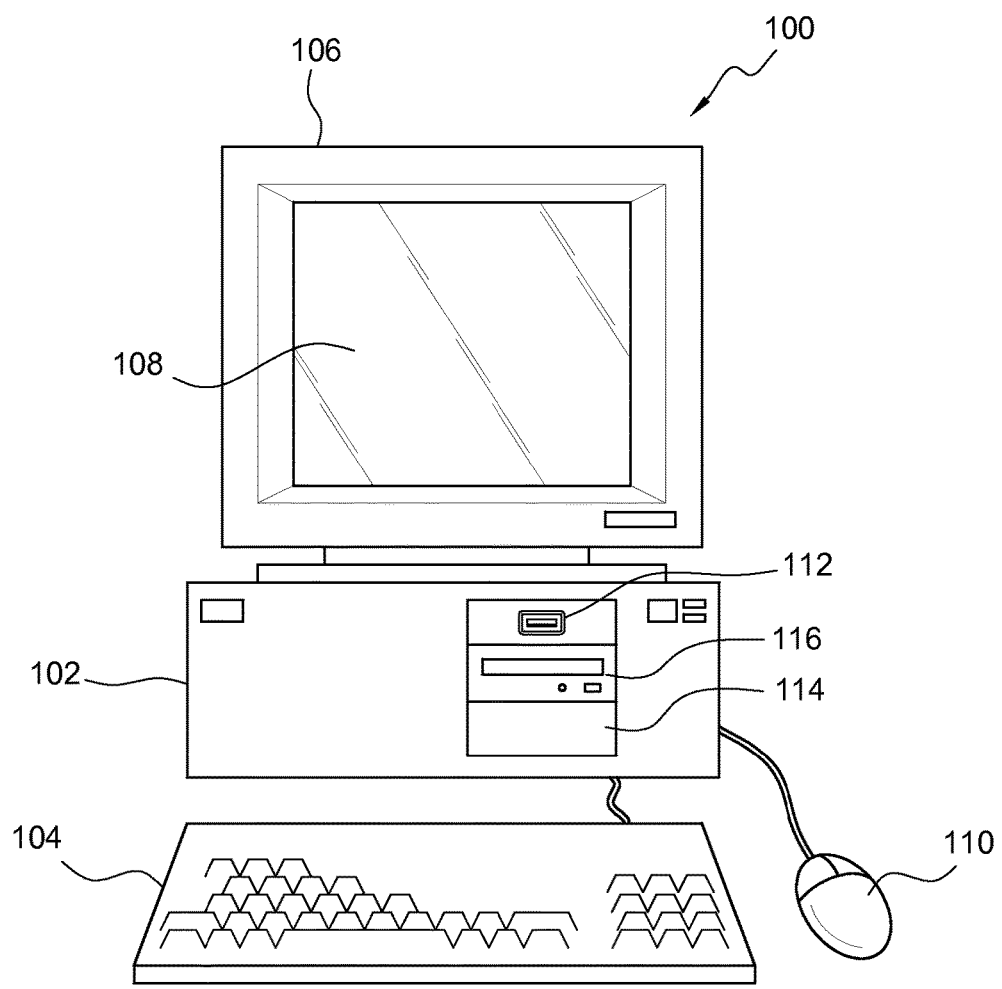
FIG. 1 illustrates a front elevational view of an exemplary computer system that is suitable to implement at least part of a central computer system, at least part of one or more user computer systems, and/or at least part of one or more third party computer systems of the system of FIG. 3, and/or to implement at least part of one or more of the activities of the method of FIG. 6 or one or more other methods described herein.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Some embodiments include a system. The system comprises an input device, an output device, one or more processing modules, and one or more non-transitory memory storage modules storing computer instructions configured to run on the processing module(s) and perform acts of: receiving a search query; and responsive to receiving the search query: identifying a restricted group of questions, the questions of the restricted group of questions being relevant to the search query; transforming the restricted group of questions into a first group of questions and a second group of questions, the questions of the restricted group of questions comprising the questions of the first group of questions and the questions of the second group of questions; and communicating to a user the first group of questions and the second group of questions. The input device and the output device are configured to permit an operator of the system to manage the processing module(s) and the non-transitory memory storage module(s).

Further embodiments include a method. The method comprises: executing one or more first computer instructions configured to receive a search query; and responsive to executing the first computer instruction(s): executing one or more second computer instructions configured to identify a restricted group of questions, the questions of the restricted group of questions being relevant to the search query; executing one or more third computer instructions configured to transform the restricted group of questions into a first group of questions and a second group of questions, the questions of the restricted group of questions comprising the questions of the first group of questions and the questions of the second group of questions; and executing one or more fourth computer instructions configured to communicate to a user the first group of questions and the second group of questions. The first computer instruction(s), the second computer instruction(s), the third computer instruction(s), and the fourth computer instruction(s) are configured to run at one or more processing modules and configured to be stored at one or more non-transitory memory storage modules.

Other embodiments include a method. The method comprises: executing one or more first computer instructions configured to receive a search query; and responsive to executing the first computer instruction(s): executing one or more second computer instructions configured to identify a restricted group of text snippets, the text snippets of the restricted group being relevant to the search query; executing one or more third computer instructions configured to transform the restricted group of text snippets into a first group of text snippets and a second group of text snippets, the text snippets of the restricted group of text snippets comprising the text snippets of the first group of text snippets and the text snippets of the second group of text snippets; and executing one or more fourth computer instructions configured to communicate to a user the first group of text snippets and the second group of text snippets. The first computer instruction(s), the second computer instruction(s), the third computer instruction(s), and the fourth computer instruction(s) are configured to run at one or more processing modules and configured to be stored at one or more non-transitory memory storage modules.

Figure 2:
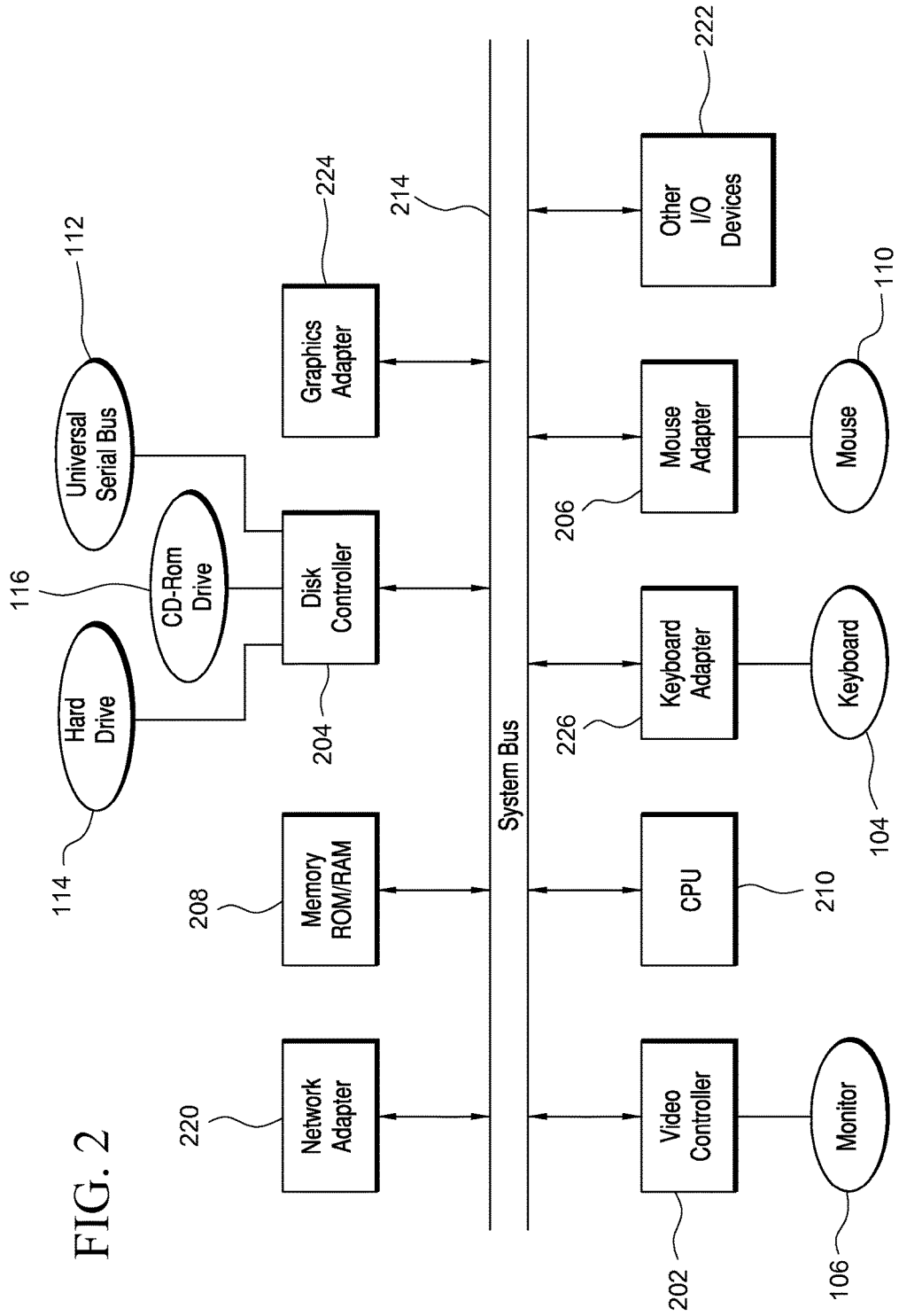
FIG. 2 illustrates a representative block diagram of exemplary elements included on the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a refreshing monitor 106, a keyboard 104, and/or a mouse 110, etc.) can also be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM), Digital Video Disc (DVD) drive, and/or Blu-ray drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) volatile (e.g., transitory) memory, such as, for example, read only memory (ROM) and/or (ii) non-volatile (e.g., non-transitory) memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. The memory storage module(s) of the various embodiments disclosed herein can comprise memory storage unit 208, an external memory storage drive (not shown), such as, for example, a USB-equipped electronic memory storage drive coupled to universal serial bus (USB) port 112 (FIGS. 1 & 2), hard drive 114 (FIGS. 1 & 2), CD-ROM and/or DVD drive 116 (FIGS. 1 & 2), a floppy disk drive (not shown), an optical disc (not shown), a magneto-optical disc (now shown), magnetic tape (not shown), etc. Further, non-volatile or non-transitory memory storage module(s) refer to the portions of the memory storage module(s) that are non-volatile (e.g., non-transitory) memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) or Unified Extensible Firmware Interface (UEFI) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. Meanwhile, the operating system can perform basic tasks such as, for example, controlling and allocating memory, prioritizing the processing of instructions, controlling input and output devices, facilitating networking, and managing files. Exemplary operating systems can comprise (i) Microsoft® Windows® operating system (OS) by Microsoft Corp. of Redmond, Wash., United States of America, (ii) Mac® OS by Apple Inc. of Cupertino, Calif., United States of America, (iii) UNIX® OS, and (iv) Linux® OS. Further exemplary operating systems can comprise (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States of America, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1 & 2) and mouse 110 (FIGS. 1 & 2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing monitor 106 (FIGS. 1 & 2) to display images on a screen 108 (FIG. 1) of computer system 100 (FIG. 1). Disk controller 204 can control hard drive 114 (FIGS. 1 & 2), USB port 112 (FIGS. 1 & 2), and CD-ROM drive 116 (FIGS. 1 & 2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein. In various embodiments, computer 100 can be reprogrammed with one or more modules, applications, and/or databases to convert computer system 100 from a general purpose computer to a special purpose computer.

Further, although computer system 100 is illustrated as a desktop computer in FIG. 1, in many examples, system 100 can have a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smart phone. In certain additional embodiments, computer system 100 may comprise an embedded system.

Figure 3:
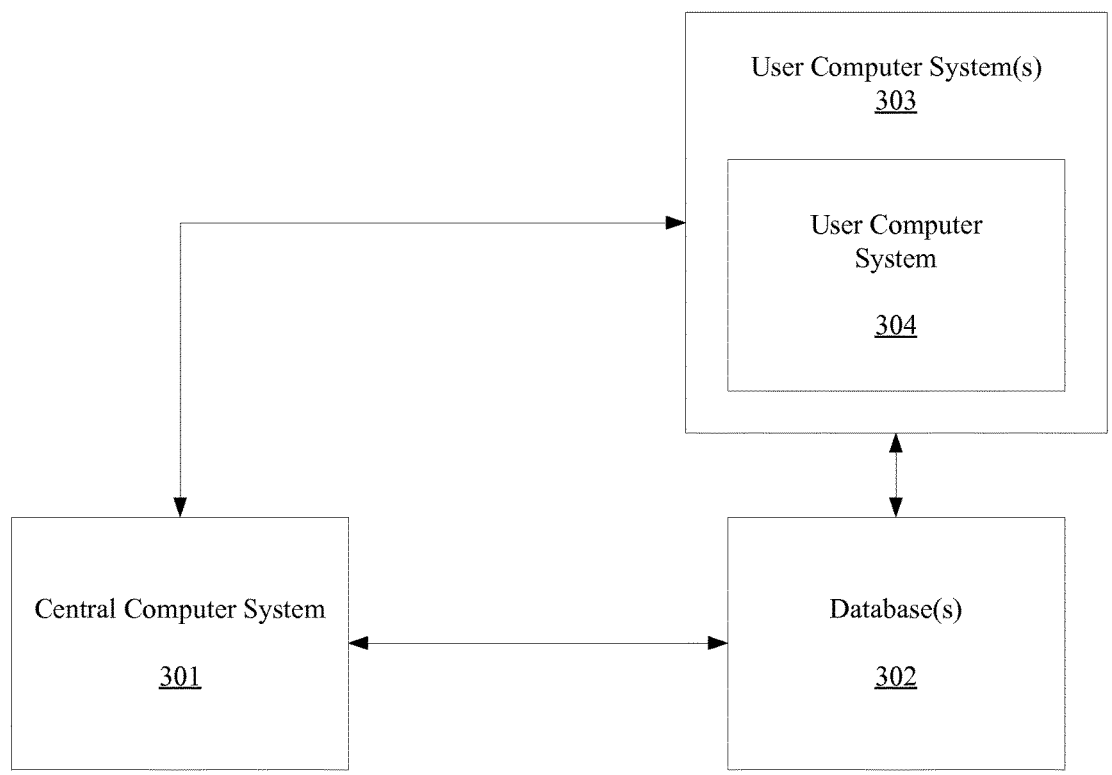
FIG. 3 illustrates a representative block diagram of a system, according to an embodiment.
Figure 6:
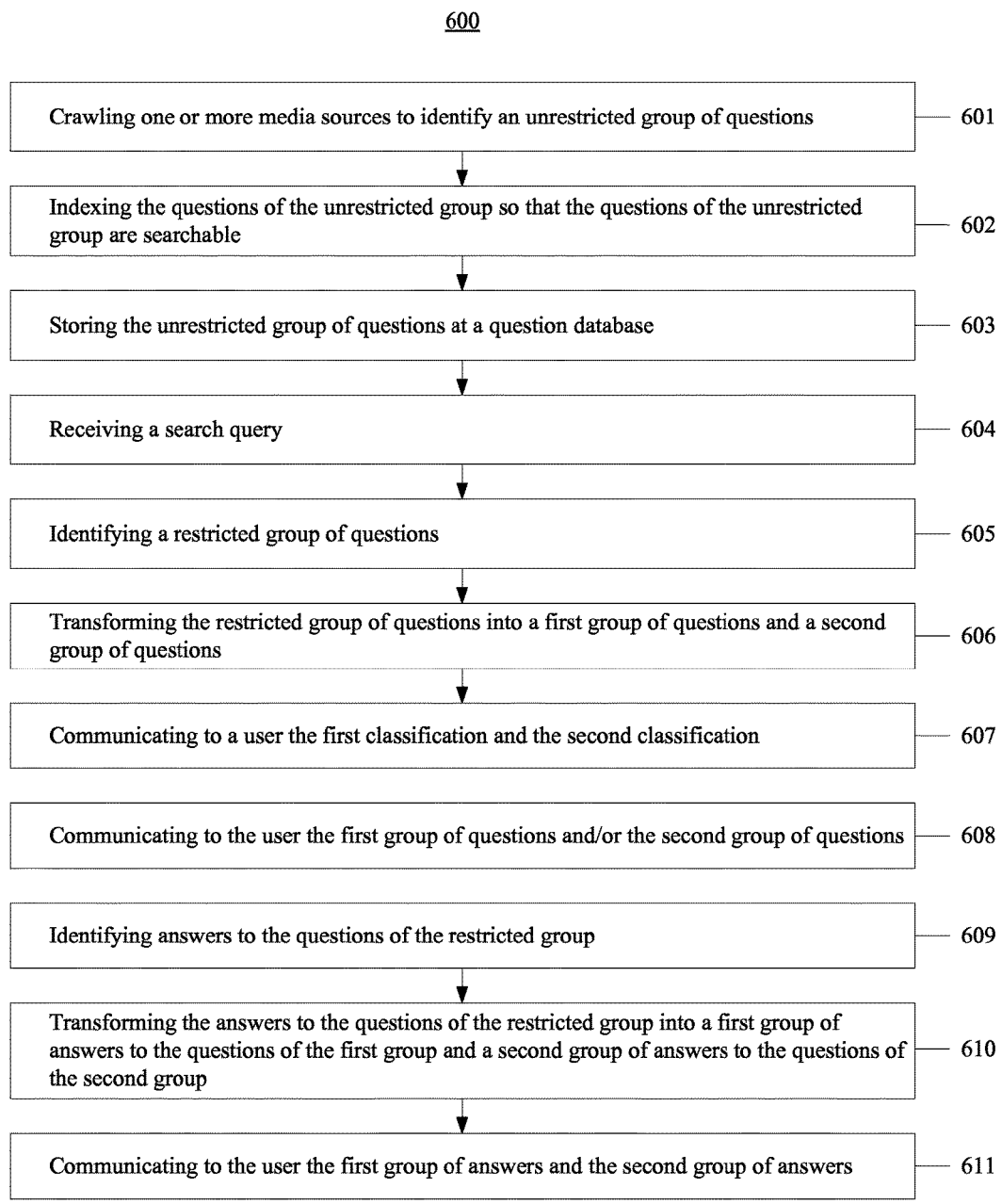
FIG. 6 illustrates a flow chart for a method, according to an embodiment.

Skipping ahead now in the drawings, FIG. 3 illustrates a representative block diagram of a system 300, according to an embodiment. In many embodiments, system 300 can comprise a computer system. In some embodiments, system 300 can be implemented to perform part or all of a method. The method can be similar or identical to method 600 (FIG. 6).

System 300 is merely exemplary and embodiments of the system are not limited to the embodiments presented herein. System 300 can be employed in many different embodiments or examples not specifically depicted or described herein. In some embodiments, certain elements or modules of system 300 can perform various methods and/or activities of those methods. In these or other embodiments, the methods and/or the activities of the methods can be performed by other suitable elements or modules of system 300.

As explained in greater detail below, in many embodiments, system 300 can be operable to outline search content (e.g., questions and/or answers to the questions, etc.) relating to a search query of a user of system 300; in further embodiments, system 300 can be operable to rank and/or classify the relevant search content being outlined so that the user is able to better distinguish the relevant search content; and in still further embodiments, system 300 can communicate (e.g., display) the outlined relevant search content to the user. Accordingly, system 300 can facilitate navigation, review, and understanding of the relevant search content by the user of system 300. Notably, the search query can relate to a topic of interest to the user of system 300.

In many examples, the relevant search content can be substantial in scope (e.g., quantity and/or volume), and in these or other examples, can be part of a larger body of general search content comprising the relevant search content. Accordingly, the scope of the relevant search content available to the user of system 300 may be too substantial for the user to meaningfully review absent system 300. Accordingly, system 300 can permit the user to consider relevant search content that the user may otherwise have had insufficient time and resources to consider.

Further, when a user of system 300 intends to author and/or publish one or more media sources that will include potential search content, system 300 can permit the user (e.g., author and/or publisher) to identify relevant search content to include in the media source(s) to increase a likelihood that the media source(s) will be consumed. For example, in many examples, by including more relevant search content in the media source(s), the media source(s) may be better searchable and/or identifiable by consumers of the media source(s). Accordingly, the user can better engage with consumers of the media source(s), which may be particularly advantageous when the consumers of the media source(s) are customers of the author and/or publisher of the media source(s).

Generally, therefore, system 300 can be implemented with hardware and/or software, as described herein. In some embodiments, at least part of the hardware and/or software can be conventional, while in these or other embodiments, part or all of the hardware and/or software can be customized (e.g., optimized) for implementing part or all of the functionality of system 300 described herein.

Specifically, system 300 can comprise a central computer system 301. In many embodiments, central computer system 301 can be similar or identical to computer system 100 (FIG. 1). Accordingly, central computer system 301 can comprise one or more processing modules and one or more memory storage modules (e.g., one or more non-transitory memory storage modules). In these or other embodiments, the processing module(s) and/or the memory storage module(s) can be similar or identical to the processing module(s) and/or memory storage module(s) (e.g., non-transitory memory storage modules) described above with respect to computer system 100 (FIG. 1). In some embodiments, central computer system 301 can comprise a single computer or server, but in many embodiments, central computer system 301 comprises a cluster or collection of computers or servers and/or a cloud of computers or servers. Meanwhile, central computer system 301 can comprise one or more input devices (e.g., one or more keyboards, one or more keypads, one or more pointing devices such as a computer mouse or computer mice, one or more touchscreen displays, etc.), and/or can comprise one or more output devices (e.g., one or more monitors, one or more touch screen displays, one or more speakers, etc.). Accordingly, the input device(s) can comprise one or more devices configured to receive one or more inputs and/or the output device(s) can comprise one or more devices configured to provide (e.g., present, display, emit, etc.) one or more outputs. For example, in these or other embodiments, one or more of the input device(s) can be similar or identical to keyboard 104 (FIG. 1) and/or a mouse 110 (FIG. 1). Further, one or more of the output device(s) can be similar or identical to refreshing monitor 106 (FIG. 1) and/or screen 108 (FIG. 1). The input device(s) and the output device(s) can be coupled to the processing module(s) and/or the memory storage module(s) of central computer system 301 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the output device(s) to the processing module(s) and/or the memory storage module(s). In some embodiments, the KVM switch also can be part of central computer system 301. In a similar manner, the processing module(s) and the memory storage module(s) can be local and/or remote to each other.

In many embodiments, central computer system 301 is configured to communicate with one or more user computer systems 303 (e.g., a user computer system 304) of one or more users of system 300. For example, the user(s) can interface (e.g., interact) with central computer system 301, and vice versa, via user computer system(s) 303. In some embodiments, system 300 can comprise user computer system(s) 303.

In many embodiments, central computer system 301 can refer to a back end of system 300 operated by an operator and/or administrator of system 300. In these or other embodiments, the operator and/or administrator of system 300 can manage central computer system 301, the processing module(s) of central computer system 301, and/or the memory storage module(s) of central computer system 301 using the input device(s) and/or output device(s) of central computer system 301.

Like central computer system 301, user computer system(s) 303 each can be similar or identical to computer system 100 (FIG. 1), and in many embodiments, each of user computer system(s) 303 can be similar or identical to each other. In many embodiments, user computer system(s) 303 can comprise one or more desktop computer devices, one or more wearable user computer devices, and/or one or more mobile devices, etc. At least part of central computer system 301 can be located remotely from user computer system(s) 303.

In some embodiments, a mobile device can refer to a portable electronic device (e.g., an electronic device easily conveyable by hand by a person of average size) with the capability to present audio and/or visual data (e.g., images, videos, music, etc.). For example, a mobile device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can comprise a volume and/or weight sufficiently small as to permit the mobile device to be easily conveyable by hand. For examples, in some embodiments, a mobile device can occupy a volume of less than or equal to approximately 189 cubic centimeters, 244 cubic centimeters, 1790 cubic centimeters, 2434 cubic centimeters, 2876 cubic centimeters, 4056 cubic centimeters, and/or 5752 cubic centimeters. Further, in these embodiments, a mobile device can weigh less than or equal to 3.24 Newtons, 4.35 Newtons, 15.6 Newtons, 17.8 Newtons, 22.3 Newtons, 31.2 Newtons, and/or 44.5 Newtons.

Exemplary mobile devices can comprise, but are not limited to, one of the following: (i) an iPod®, iPhone®, iPod Touch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia®, Surface Pro™, or similar product by the Microsoft Corporation of Redmond, Wash., United States of America, and/or (iv) a Galaxy™, Galaxy Tab™, Note™, or similar product by the Samsung Group of Samsung Town, Seoul, South Korea. Further, in the same or different embodiments, a mobile device can comprise an electronic device configured to implement one or more of (i) the iOS™ operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by Google, Inc. of Mountain View, Calif., United States, (v) the Windows Mobile™, Windows Phone™, and Windows 10 (mobile)™ operating systems by Microsoft Corporation of Redmond, Wash., United States of America, or (vi) the Symbian™ operating system by Nokia Corp. of Keilaniemi, Espoo, Finland.

Meanwhile, in many embodiments, for reasons explained later herein, central computer system 301 also can be configured to communicate with one or more search content databases 302 (e.g., one or more question databases 512 (FIG. 5), one or more answer databases 513 (FIG. 5), etc.). Search content database(s) 302 can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of search content database(s) 302, that particular database can be stored on a single memory storage module of the memory storage module(s) and/or the non-transitory memory storage module(s) storing search content database(s) 302 or it can be spread across multiple of the memory storage module(s) and/or non-transitory memory storage module(s) storing search content database(s) 302, depending on the size of the particular database and/or the storage capacity of the memory storage module(s) and/or non-transitory memory storage module(s).

In these or other embodiments, the memory storage module(s) of central computer system 301 can comprise some or all of the memory storage module(s) storing search content database(s) 302. In further embodiments, some of the memory storage module(s) storing search content database(s) 302 can be part of one or more of user computer system(s) 303 and/or one or more third-party computer systems (i.e., other than central computer system 301 and/or user computer system(s) 303), and in still further embodiments, all of the memory storage module(s) storing search content database(s) 302 can be part of one or more of user computer system(s) 303 and/or one or more of the third-party computer system(s). Like central computer system 301 and/or user computer system(s) 303, when applicable, each of the third-party computer system(s) can be similar or identical to computer system 100 (FIG. 1). Notably, the third-party computer systems are not shown at FIG. 3 in order to avoid unduly cluttering the illustration of FIG. 3, and search content database(s) 302 are illustrated at FIG. 3 apart from central computer system 301 and user computer system(s) 303 to better illustrate that search content database(s) 302 can be stored at memory storage module(s) of central computer system 301, user computer system(s) 303, and/or the third-party computer system(s), depending on the manner in which system 300 is implemented.

Search content database(s) 302 each can comprise a structured (e.g., indexed) collection of data and can be managed by any suitable database management systems configured to define, create, query, organize, update, and manage search content database(s). Exemplary database management systems can include MySQL (Structured Query Language) Database, PostgreSQL Database, Microsoft SQL Server Database, Oracle Database, SAP (Systems, Applications, & Products) Database and IBM DB2 Database.

Meanwhile, communication between central computer system 301, user computer system(s) 303, the third-party computer system(s), and/or search content database(s) 302 can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), Powerline network protocol(s), etc.). Exemplary PAN protocol(s) can comprise Bluetooth, Zigbee, Wireless Universal Serial Bus (USB), Z-Wave, etc. Exemplary LAN and/or WAN protocol(s) can comprise Data Over Cable Service Interface Specification (DOCSIS), Institute of Electrical and Electronic Engineers (IEEE) 802.3 (also known as Ethernet), IEEE 802.11 (also known as WiFi), etc. Exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.

For convenience, the functionality of system 300 is described generally herein as it relates particularly to user computer system 304, a single user, and a single search query of the single user, but in many embodiments, the functionality of system 300 can be repeated for any desirable quantity of search queries and/or can be extended to multiple (e.g., all) of user computer system(s) 303, multiple users, and multiple search queries of the multiple users, at the same or at different times.

Also for convenience, the functionality of system 300 is described generally herein as it relates to search content comprising literary questions, and in some embodiments, literary answers to the questions, but in many embodiments, the functionality of system 300 can be extended such that the search content comprises any suitable snippets of media (i.e., media snippets) from one or more media sources. Each of the media source(s) can comprise one or more literary (e.g., text) works, one or more audio works, and/or one or more visual (e.g., image or video) works, and accordingly, each media snippet can comprise a literary (e.g., text) snippet of a literary (e.g., text) work, an audio snippet of an audio work, or a visual (e.g., image or video) snippet of a visual (e.g., image or video) work of the media source(s).

In these or other embodiments, exemplary media source(s) can comprise one or more books, one or more magazines, one or more brochures, one or more pamphlets, one or more leaflets, one or more documents (e.g., forms), one or more periodicals, one or more briefs, one or more compilations, one or more memorandums, one or more web pages (e.g., web page forums, transactional web pages, social networking web pages, etc.), one or more sound (e.g., voice and/or music) recordings, one or more images, one or more videos, etc. Notably, the media source(s) can be electronically formatted originally or by conversion. Meanwhile, exemplary literary work(s) can comprise one or more articles, one or more autobiographies, one or more biographies, one or more compositions, one or more essays, one or more scripts, one or more novels, one or more abstracts, one or more theses, one or more poems, one or more dissertations, one or more novellas, one or more logs (e.g., blogs), one or more journals, one or more forums, etc. Further, in many embodiments, some exemplary literary (e.g., text) snippets can comprise or consist of questions, answers to the questions, declarations (e.g., opinions), headlines, and/or titles, etc. of literary work(s). In some of these embodiments, text snippets can exclude individual words and/or combinations of words lacking grammatical linkage. Meanwhile, in further embodiments, some exemplary audio snippets can be similar or identical to the literary snippets but can be auditory.

Figure 4:
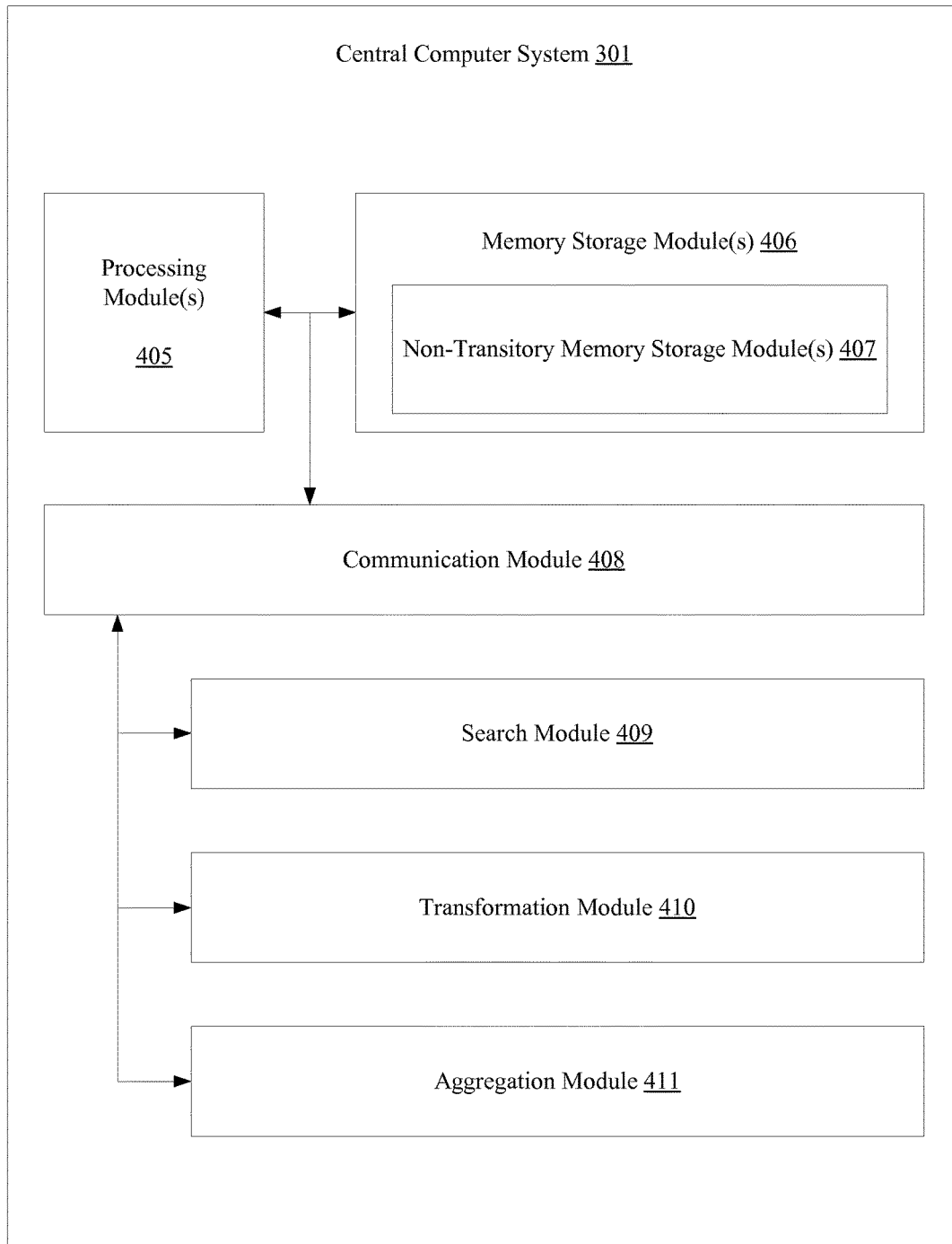
FIG. 4 illustrates a representative block diagram of a central computer system of the system of FIG. 3, according to the embodiment of FIG. 3.
Figure 5:
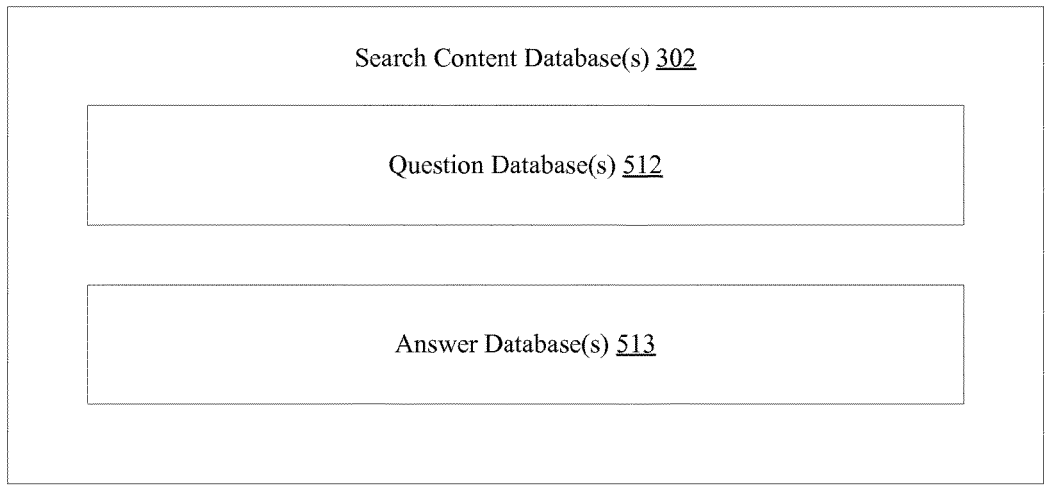
FIG. 5 illustrates a representative block diagram of one or more databases of the system of FIG. 3, according to the embodiment of FIG. 3.

Turning ahead now in the drawings, FIG. 4 illustrates a representative block diagram of central computer system 301, according to the embodiment of FIG. 3; and FIG. 5 illustrates a representative block diagram of search content database(s) 302, according to the embodiment of FIG. 3.

Referring first to FIG. 4, in many embodiments, central computer system 301 can comprise one or more processing modules 405 and one or more memory storage modules 406. Further, memory storage module(s) 406 can comprise one or more non-transitory memory storage modules 407.

Meanwhile, in these or other embodiments, central computer system 301 comprises a communication module 408, a search module 409, and a transformation module 410. Further, in some embodiments, central computer system 301 can comprise an aggregation module 411. In these or other embodiments, part or all of at least one or more of communication module 408, search module 409, transformation module 410, and/or aggregation module 411 can be part of at least one or more others of communication module 408, search module 409, transformation module 410, and/or aggregation module 411, and vice versa. In some embodiments, aggregation module 411 can be omitted.

Referring briefly to FIG. 5, as explained in greater detail below, search content database(s) 302 can comprise one or more constituent databases corresponding to a category (e.g., type) of search content for which system 300 (FIG. 3) and/or search module 409 (FIG. 4) is implemented to search. For example, in some embodiments, search content database(s) 302 can comprise question database(s) 512. In these embodiments, search content database(s) 302 also can comprise answer database(s) 513. In further embodiments, when system 300 is implemented with other search content (e.g., media snippets) in addition to or alternative to questions and/or answers to the questions as discussed above, search content database(s) 302 can comprise, for example, headline database(s), declaration database(s), title database(s), etc. In some embodiments, part or all of at least one of the constituent database(s) of search content database(s) 302 (e.g., question database(s) 512, answer database(s) 513, headline database(s), declaration database(s), title database(s), etc.) can be part of at least one other of the constituent database(s) of search content database(s) 302.

Returning now back to FIG. 4, in many embodiments, processing module(s) 405 can be similar or identical to the processing module(s) described above with respect to computer system 100 (FIG. 1) and/or central computer system 301 (FIG. 3); memory storage module(s) 406 can be similar or identical to the memory storage module(s) described above with respect to computer system 100 (FIG. 1) and/or central computer system 301 (FIG. 3); and/or non-transitory memory storage module(s) 407 can be similar or identical to the non-transitory memory storage module(s) described above with respect to computer system 100 (FIG. 1) and/or central computer system 301 (FIG. 3). Further, communication module 408, search module 409, transformation module 410, and aggregation module 411 can be implemented with hardware and/or software, as desirable. Although communication module 408, search module 409, transformation module 410, and aggregation module 411 are shown at FIG. 4 as being separate from processing module(s) 405, memory storage module(s) 406, and/or non-transitory memory storage module(s) 407, in many embodiments, part or all of communication module 408, search module 409, transformation module 410, and/or aggregation module 411 can be stored at memory storage module(s) 406 and/or non-transitory memory storage module(s) 407 and can be called and run at processing module(s) 405, such as, for example, when the part or all of communication module 408, search module 409, transformation module 410, and/or aggregation module 411 are implemented as software.

Communication Module 408

Communication module 408 is operable to provide and manage communication between the various elements of central computer system 301 (e.g., processing module(s) 405, memory storage module(s) 406, non-transitory memory storage module(s) 407, communication module 408, search module 409, transformation module 410, aggregation module 411, etc.) and manage incoming and outgoing communications between central computer system 301 (FIG. 3) and user computer system(s) 303 of FIG. 3 (e.g., user computer system 304 (FIG. 3)), the third party computer system(s), and/or search content database(s) 302 (FIG. 3). Like the communications between central computer system 301 (FIG. 3), user computer system(s) 303 (FIG. 3), the third party computer system(s), and/or search content database(s) 302 (FIG. 3), communication module 408 can be implemented using any suitable manner of wired and/or wireless communication, and/or using any one or any combination of wired and/or wireless communication network topologies and/or protocols, as described above with respect to the central computer system 301 (FIG. 3), user computer system(s) 303 (FIG. 3), the third party computer system(s), and/or search content database(s) 302 (FIG. 3). In many embodiments, communication module 408 can be part of hardware and/or software implemented for communications between central computer system 301 (FIG. 3), user computer system(s) 303 (FIG. 3), the third party computer system(s), and/or search content database(s) 302 (FIG. 3). For example, as applicable, communication module 408 can permit processing module(s) 405 to call (i) software (e.g., at least part of search module 409, transformation module 410, and/or aggregation module 411, etc.) stored at memory storage module(s) 406 and/or non-transitory memory storage module(s) 407, and/or (ii) data stored at memory storage module(s) 406, at non-transitory memory storage module(s) 407, and/or in search content database(s) 302 (FIG. 3).

Search Module 409

Search module 409 is operable to receive a search query of a user of system 300 (FIG. 3). In implementation, search module 409 can receive the search query from the user (e.g., from user computer system 304 of the user) via communication module 408, as described above.

In many embodiments, the search query can relate to a topic of interest. For example, the search query can comprise one or more words (e.g., keywords) relating to the topic of interest. In these embodiments, the topic of interest can comprise any suitable topic about which the user of system 300 (FIG. 3) desires to obtain information. In some embodiments, the search query can comprise a web search query.

Further, search module 409 can be operable to identify a restricted group of questions, such as, for example, from an unrestricted group of questions. In these or other embodiments, search module 409 can identify the restricted group of questions responsive to receiving the search query of the user of system 300 (FIG. 3).

In these or other embodiments, the questions of the restricted group can relate to the search query received by search module 409 and/or to the topic of interest. In many embodiments, the questions of the restricted group can be part of an unrestricted group of questions. Meanwhile, at least part of the questions of the unrestricted group can be unrelated to the search query received by search module 409 and/or the topic of interest. Accordingly, in order to identify the restricted group of questions, search module 409 can search the questions of the unrestricted group to determine the questions of the restricted group within the questions of the unrestricted group. Thus, the restricted group of questions can refer to a relevant group of questions, and an unrestricted group of questions can refer to a general group of questions that includes the relevant group of questions as well as other questions.

In these embodiments, the questions of the unrestricted group can be indexed according to an indexing scheme. Further, search module 409 can implement a search engine algorithm able to reference the indexing scheme to search the questions of the unrestricted group to determine the questions of the restricted group within the questions of the unrestricted group.

In many embodiments, the indexing scheme and/or search engine algorithm can be customized, but in other embodiments, the indexing scheme and/or search engine algorithm can be implemented using any suitable conventional indexing scheme and/or search engine algorithm. For example, in some embodiments, search module 409 can implement the indexing scheme and search engine algorithm of: (i) the Google Search web search engine by Google Inc. of Mountain View, Calif., United States of America, (ii) the Yahoo Search web search engine by Yahoo Inc. of Sunnyvale, Calif., United States of America, (iii) the Bing web search engine by Microsoft Corp. of Redmond, Wash., United States of America, etc.

Further, in some embodiments, the user of system 300 (FIG. 3) can select the indexing scheme and search engine algorithm (i.e., search engine preference) that search module 409 implements to search the questions of the unrestricted group to determine the questions of the restricted group from the questions of the unrestricted group. In these or other embodiments, the user can select a location preference (e.g., country of search) and/or language preference (e.g., language of search) for the questions of the unrestricted group to be searched by system 300 (FIG. 3) and/or search module 409. Accordingly, in many embodiments, search module 409 can receive a search engine preference, a location preference, and/or a language preference from the user. In implementation, search module 409 can receive the search engine preference, the location preference, and/or the language preference from the user (e.g., from user computer system 304 of the user) via communication module 408, as described above.

Meanwhile, the questions of the unrestricted group can be stored at question database(s) 512 (FIG. 5). Accordingly, search module 409 can reference search content database(s) 302 (FIG. 3), and more specifically, question database(s) 512 (FIG. 5) in order to search the questions of the unrestricted group to determine the questions of the restricted group from the questions of the unrestricted group. In some embodiments, the questions of the unrestricted group can be managed (e.g., determined, indexed, and/or stored) at question database(s) 512 (FIG. 5) by aggregation module 411, as explained in greater detail below. However, in other embodiments, the questions of the unrestricted group can be managed (e.g., determined, indexed, and/or stored) at question database(s) 512 (FIG. 5) by a third party, in which case aggregation module 411 can be omitted.

Transformation Module 410

Transformation module 410 can be operable to transform (e.g., outline) the restricted group of questions into multiple groups (i.e., sub-groups) of questions. Accordingly, the questions of the restricted group comprise the questions of the sub-groups. In some embodiments, the sub-groups can be referred to as clusters. In these or other embodiments, transformation module 410 can transform the restricted group of questions into the multiple sub-groups of questions in response to search module 409 receiving the search query and/or identifying the restricted group of questions. Accordingly, search module 409 can communicate the restricted group of questions to transformation module 410 via communication module 408.

Transformation module 410 can transform (e.g., outline) the restricted group of questions into the multiple sub-groups of questions by identifying associations of the questions of the restricted group with each other such that the questions of each particular sub-group share an association in common with each other. In some embodiments, one or more questions of the restricted group can be included in two or more of the multiple sub-groups. That is, in these embodiments, some of the questions of the multiple sub-groups can overlap. Meanwhile, in other embodiments, the questions included in the multiple sub-groups can be exclusive to one sub-group of the multiple sub-groups. That is, in these embodiments, none of the questions of the multiple sub-groups overlap. Whether or not the questions of the multiple sub-groups overlap each other can depend on the manner in which the questions within the multiple sub-groups are associated.

Generally, transformation module 410 can transform (e.g., outline) the restricted group of questions into the multiple sub-groups of questions according to any suitable manner of shared association. For example, in some embodiments, the questions of the multiple sub-groups can be grouped together according to one or more common or shared keywords associated with and/or contained within the questions of a particular sub-group.

In other embodiments, the questions of the multiple sub-groups can be grouped together according to the questions of a particular sub-group satisfying a threshold value of a feature commonality metric relative to each other. For example, in these embodiments, a feature commonality metric can refer to a metric quantifying a similarity and/or dissimilarity comparison of any two questions of the restricted group relative to each other. In some embodiments, the feature commonality metric can be referred to as a distance of the two questions.

When implementing the feature commonality metric to provide the multiple sub-groups, transformation module 410 can analyze one or more features of the two questions being compared. Although any suitable features can be considered by transformation module 410, exemplary features can comprise a quantity of one or more words in common for two questions, a difference in a number of words separating two or more words in common for the two questions, a difference in a quantity of words for the two questions, an order of words in common for the two questions, a grammatical type of one or more words in common for the two questions, a word choice of one or more words in common for the two questions, a number of characters of one or more words in common for the two questions, a language of one or more words in common for the two questions, etc. In further embodiments, a quantitative weight can be applied to each feature being considered by transformation module 410. When transformation module 410 considers multiple features of the questions, the quantitative weight applied to two or more features being considered can be the same, and/or the quantitative weight applied to two or more features considered can be different.

In analyzing the feature(s) of the two questions being compared, transformation module 410 can calculate at least one score comparing the two questions being considered. For example, in these embodiments, transformation module 410 can calculate a convergence score and/or a divergence score of the two questions being considered. The convergence score can refer to a quantitative measure of similarity of the two questions being considered, and the divergence score can refer to a quantitative measure of dissimilarity of the two questions being considered. Meanwhile, in these or other embodiments, the feature commonality metric can comprise the quotient of the divergence score divided by the sum of the convergence score and the divergence score. Accordingly, in these embodiments, as the feature commonality metric approaches zero, the two questions being considered can be increasingly similar to each other, and as the feature commonality metric approaches one, the two questions being considered can be decreasingly similar to each other.

Transformation module 410 can implement any desirable threshold value of the feature commonality metric to be satisfied when providing the multiple sub-groups. For example, in some embodiments, the threshold value of the feature commonality metric can comprise approximately 0.05. In these or other embodiments, satisfying the threshold value of the feature commonality metric can comprise remaining below the threshold value of the feature commonality metric. However, in other embodiments, satisfying the threshold value of the feature commonality metric can comprise remaining above the threshold value of the feature commonality metric. In some embodiments, the user of system 300 (FIG. 3) can select the threshold value.

Further, in some embodiments, transformation module 410 can be operable to classify (e.g., name, score, etc.) the multiple sub-groups of questions with classifications. In many embodiments, transformation module 410 can classify a particular sub-group of the multiple sub-groups according to the questions included in that particular sub-group. In these or other embodiments, classifying the multiple sub-groups of questions can clearly and/or concisely summarize for the user of system 300 (FIG. 3) the questions included in a particular sub-group of the multiple sub-groups. For example, the classifications can comprise a name representative of the questions of the particular sub-group and/or one or more scores identifying one or more characteristics of the questions of the particular sub-group, such as, for example, an average relevance of the questions of the particular sub-group to the search query received by system 300 (FIG. 3) and/or search module 409.

In some embodiments, the manner of classification of the multiple sub-groups can correspond to the manner of question association of the multiple sub-groups. For example, when the manner of question association comprises keyword association, as described above, the manner of classification can comprise a name, and the name can comprise the common keywords. However, in other embodiments, the manner of classification of the multiple sub-groups can be implemented independently of the manner of question association of the multiple sub-groups. In further embodiments, any suitable manner of classification of the multiple sub-groups can be implemented that provides additional, clear, and/or concise information to the user of system 300 (FIG. 3).

Further, in some embodiments, transformation module 410 can be operable to rank (e.g., order) the questions within the particular sub-groups of the multiple sub-groups relative to each other and/or to rank (e.g., order) the multiple sub-groups relative to each other. In these or other embodiments, the questions within the particular sub-groups of the multiple sub-groups and/or the multiple sub-groups can be ranked (e.g., ordered) in any suitable manner.

In some embodiments, the questions within particular sub-groups can be ranked (e.g., ordered) according to the relevance of the questions to the search query. For example, more relevant questions can be ranked higher than less relevant questions. In many embodiments, the relevance of the questions within the particular sub-groups to the search query can be determined in any suitable manner. For example, in some embodiments, the relevance to the search query of the questions within particular sub-groups can be determined by comparison of one or more features in common of a question and the search query. The feature(s) can be similar or identical to the feature(s) described above with respect to the feature commonality metric. In these or other embodiments, the relevance of the search query to the questions within particular sub-groups can be determined by considering a reliability of an author, a publisher, and/or an aggregator of the media source(s) from which the questions originated, a date of creation of the media source(s) from which the questions originated, and/or a date of last modification of the media source(s) from which the questions originated.

In these or other embodiments, the multiple sub-groups can be ranked (e.g., ordered) according to a quantity of the questions of a particular sub-group relative to the other sub-groups. For example, sub-groups with more questions can be ranked higher than sub-groups with less questions.

In many embodiments, transformation module 410 can be operable to communicate one or more (e.g., multiple, all, and/or no more than a predetermined number) of the classifications of the multiple sub-groups to the user of system 300 (FIG. 3). In these or other embodiments, transformation module 410 can communicate the one or more of the classifications of the multiple sub-groups to the user responsive to search module 409 receiving the search query of the user of system 300 (FIG. 3) and/or identifying the restricted group of questions. In further embodiments, when transformation module 410 communicates at least multiple of the one or more of the classifications of the multiple sub-groups to the user of system 300 (FIG. 3) and when transformation module 410 ranks the multiple sub-groups relative to each other, transformation module 410 can be operable to communicate the multiple classifications to the user of system 300 (FIG. 3) in a classification order corresponding to a group order in which the multiple sub-groups are ranked relative to each other (e.g., highest to lowest, lowest to highest, etc.). In some embodiments, the user can customize the quantity of classifications shown, the manner in which the classifications are ordered, etc. In implementation, transformation module 410 can communicate the one or more of the classifications of the multiple sub-groups to the user (e.g., to user computer system 304 of the user) via communication module 408, as described above.

Further, in many embodiments, transformation module 410 can be operable to communicate one or more (e.g., multiple, all, and/or no more than a predetermined number) of the multiple sub-groups to the user of system 300 (FIG. 3). In these or other embodiments, transformation module 410 can communicate the one or more of the multiple sub-groups to the user responsive to communication module 408 receiving a request to receive the one or more of the multiple sub-groups from the user of system 300 (FIG. 3). In further embodiments, when transformation module 410 communicates at least multiple of the multiple sub-groups to the user of system 300 (FIG. 3) and when transformation module 410 ranks the multiple sub-groups relative to each other, transformation module 410 can be operable to communicate the multiple sub-groups to the user of system 300 (FIG. 3) in a group order in which the multiple sub-groups are ranked relative to each other (e.g., highest to lowest, lowest to highest, etc.). In some embodiments, the user can customize the quantity of sub-groups shown, the manner in which the sub-groups are ordered, etc. In implementation, transformation module 410 can communicate the one or more of the multiple sub-groups to the user (e.g., to user computer system 304 of the user) via communication module 408, as described above.

In these or other embodiments, communication module 408 can communicate (e.g., display) the one or more classifications of the multiple sub-groups and/or the one or more of the multiple sub-groups to the user at, such as, for example, an output device (e.g., a display) of user computer system 304. Although the one or more of the multiple sub-groups can be communicated (e.g., displayed) to the user in any suitable format, in many embodiments, the one or more of the multiple sub-groups can be displayed to the user in a list format. For example, one or more (e.g., multiple, all, and/or no more than a predetermined number) sub-groups of the multiple sub-groups can be displayed as a list showing one or more (e.g., multiple, all, and/or no more than a predetermined number) of the questions of that sub-group.

When no more than a predetermined number of the classifications of the multiple sub-groups and/or of the multiple sub-groups are shown, the predetermined number can comprise any suitable number (e.g., 5, 10, 20, etc.), and in many embodiments, can comprise any suitable predetermined number of the highest ranking sub-groups of the multiple sub-groups when transformation module 410 ranks the multiple sub-groups. Further, when no more than a predetermined number of the questions of a sub-group are shown, the predetermined number also can comprise any suitable number (e.g., 5, 10, 20, etc.), and in many embodiments, can comprise any suitable predetermined number of the highest ranking questions of the sub-group when transformation module 410 ranks the questions. In some embodiments, the user can select the list of a particular sub-group of questions to see other questions that may not be shown for that sub-group. Further, in many embodiments, regardless of the number of questions shown, the questions can be displayed in order of their rank (e.g., highest to lowest, lowest to highest, etc.). In some embodiments, the user can customize the quantity of questions shown, the manner in which the questions are ordered, etc.

When no more than a predetermined number of the multiple sub-groups are shown, the predetermined number can comprise any suitable number (e.g., 5, 10, 20, etc.), and in many embodiments, can comprise any suitable predetermined number of the highest ranking sub-groups when transformation module 410 ranks the sub-groups. In some embodiments, the user can elect to see the lists of one or more sub-groups of questions that may not be shown. Further, in many embodiments, regardless of the number of sub-groups shown, the multiple sub-groups can be displayed in order of their rank (e.g., highest to lowest, lowest to highest, etc.). In some embodiments, the user can customize the quantity of sub-groups shown, the manner in which the sub-groups are ordered, etc.

Further, in these or other embodiments, when transformation module 410 classifies the multiple sub-groups, the classification(s) of a particular sub-group can be displayed in association with the list of that sub-group. In some embodiments, the user can customize the classification(s) shown, etc.

In some embodiments, transformation module 410 can receive feedback from the user in order to optimize transforming (e.g., outlining) future questions of the unrestricted group through machine learning. For example, in many embodiments, the user can identify one or more questions of the multiple sub-groups as being irrelevant to the sub-groups in which the question(s) are included, can identify one or more questions of the restricted group of questions that are irrelevant to the search query (i.e., the topic of interest), and/or can identify one or more sub-groups of the multiple sub-groups or classifications of the sub-groups that are irrelevant to the search query (i.e., the topic of interest). In further embodiments, the user can identify a preference for the manner in which transformation module 410 groups together the questions of the multiple sub-groups generally and/or with respect to each other. Accordingly, transformation module 410 can learn one or more preferences of the user regarding the manner in which transformation module 410 groups together the questions of the multiple sub-groups.

For convenience, the functionality of transformation module 410 is described generally herein as it relates particularly to a single layer of multiple sub-groups, but in many embodiments, the functionality of transformation module 410 can be extended to multiple levels of multiple sub-groups. For example, in some embodiments, questions of a particular sub-group of the multiple sub-groups can be transformed (e.g., outlined) further by transformation module 410 into multiple sub-sub-groups of questions, and so on. In some embodiments, similar or identical classification and/or ranking schemes also can be applied to these constituent sub-groups. In many embodiments, further narrowing the questions into more levels of sub-groups may permit the user of system 300 (FIG. 3) to more easily navigate, review, and understand the questions. In further embodiments, transformation module 410 can determine when to discontinue further narrowing the questions into more levels of sub-groups by determining when the returns on further narrowing become marginal to the user. For example, in some embodiments, sub-groups of questions including less than a predetermined minimum number of questions can be identified as marginal and omitted or included, but signaling transformation module 410 not to narrow further.

Aggregation Module 411

As discussed in some detail above, in many embodiments, aggregation module 411 can be operable to manage (e.g., determine, index, and/or store) the questions of the unrestricted group at question database(s) 512 (FIG. 5). In these embodiments, aggregation module 411 can determine the questions of the unrestricted group by crawling (e.g., web crawling) one or more media sources to identify the unrestricted group of questions. In many embodiments, the media source(s) can comprise one or more web pages of the Internet. However, in further embodiments, the media source(s) can be any suitable media source(s) available in an electronic format permitting crawling. For example, the media source(s) could be stored at any suitable electronic database(s), such as, for example, electronic database(s) similar or identical to search content database(s) 302 (FIG. 3). Meanwhile, in many embodiments, aggregation module 411 can index the questions of the unrestricted group so that the questions of the unrestricted group are searchable, and can store the unrestricted group of questions at question database(s) 512 (FIG. 5). Aggregation module 411 can repeat crawling, indexing, and/or storing the questions of the unrestricted group as desired and/or necessary.

Notably, in many embodiments, the functionality of search module 409 and transformation module 410, and in some embodiments, the functionality of aggregation module 411, can be extended to answers to the questions of the unrestricted group, restricted group, and multiple sub-groups. Accordingly, when applicable, answers to the questions of the unrestricted group can be stored at answer database(s) 513 (FIG. 5) for search by search module 409. In many embodiments, the answers to the questions of the multiple sub-groups can be communicated (e.g., displayed) concurrently with the questions of the multiple sub-groups, such as, for example, as part of the same lists or as separate corresponding lists. In some embodiments, one or more answers to the questions of the multiple sub-groups can be omitted when no answers were provided by the relevant media source(s) from which the questions originated.

As discussed above with respect to search content generally, system 300 (FIG. 3) can facilitate navigation, review, and understanding by the user of system 300 (FIG. 3) of questions relating to a search query of the user. For example, by identifying the restricted group of questions and then transforming (e.g., outlining) the unrestricted group of questions into multiple sub-groups of questions, and in some embodiments, (i) by ranking the questions of the multiple sub-groups and/or the multiple sub-groups and/or (ii) by classifying the multiple sub-groups, the user can quickly identify the questions of the unrestricted group that are most relevant and most important to a search query (i.e., topic of interest).

Further, when a user of system 300 intends to author and/or publish one or more media sources, system 300 can permit the user (e.g., author and/or publisher) to identify relevant questions to include (e.g., address) in the media source(s) to increase a likelihood that the media source(s) will be found, read, and/or used. For example, in many examples, by including more relevant questions in the media source(s), the media source(s) may be more easily searchable and/or identifiable by consumers of the media source(s). Accordingly, the user can better engage with consumers of the media source(s), which may be particularly advantageous when the consumers of the media source(s) are customers of the author and/or publisher of the media source(s). In these or other embodiments, the multiple sub-groups can be included in part of a briefing for the user regarding the search query (i.e., topic of interest).

Turning ahead in the drawings, FIG. 6 illustrates a flow chart for a method 600, according to an embodiment. In some embodiments, method 600 can comprise a method of outlining search content (e.g., questions relating to a search query and/or answers to the questions). In some embodiments, part or all of method 600 can be performed by a system. The system can be similar or identical to system 300 (FIG. 3).

Method 600 is merely exemplary and is not limited to the embodiments presented herein. Method 600 can be employed in many different embodiments or examples not specifically depicted or described herein. In some embodiments, the activities of method 600 can be performed in the order presented. In other embodiments, the activities of method 600 can be performed in any suitable order. In still other embodiments, one or more of the activities of method 600 can be combined or skipped. In many embodiments, central computer system 301 (FIG. 3) can be suitable to perform method 600 and/or one or more of the activities of method 600. In these or other embodiments, one or more of the activities of method 600 can be implemented as one or more computer instructions configured to run at one or more processing modules and configured to be stored at one or more non-transitory memory storage modules. The processing module(s) can be similar or identical to the processing module(s) described above with respect to computer system 100 (FIG. 1) and/or to processing module(s) 405 (FIG. 4). Further, the non-transitory memory storage module(s) can be similar or identical to the non-transitory memory storage module(s) described above with respect to computer system 100 (FIG. 1) and/or to non-transitory memory storage module(s) 407 (FIG. 4).

In many embodiments, method 600 can comprise activity 601 of crawling one or more media sources to identify an unrestricted group of questions. The media source(s) can be similar or identical to the media source(s) described above with respect to system 300 (FIG. 3). Further, the unrestricted group of questions can be similar or identical to the unrestricted group of questions described above with respect to system 300 (FIG. 3). In some embodiments, performing activity 601 can be similar or identical to crawling one or more media sources to identify an unrestricted group of questions as described above with respect to system 300 (FIG. 3).

In many embodiments, method 600 can comprise activity 602 of indexing the questions of the unrestricted group so that the questions of the unrestricted group are searchable. In some embodiments, performing activity 602 can be similar or identical to indexing the questions of the unrestricted group so that the questions of the unrestricted group are searchable as described above with respect to system 300 (FIG. 3). In various embodiments, activity 602 can be performed after activity 601.

In many embodiments, method 600 can comprise activity 603 of storing the unrestricted group of questions at a question database. The question database can be similar or identical to question database 512 (FIG. 5). In some embodiments, performing activity 602 can be similar or identical to indexing the questions of the unrestricted group so that the questions of the unrestricted group are searchable as described above with respect to system 300 (FIG. 3). In various embodiments, activity 602 can be performed after activity 601 and/or activity 602. In other embodiments, activity 603 can be performed approximately simultaneously with activity 602.

In many embodiments, method 600 can comprise activity 604 of receiving a search query. The search query can be similar or identical to the search query described above with respect to system 300 (FIG. 3). In some embodiments, performing activity 604 can be similar or identical to receiving the search query as described above with respect to system 300 (FIG. 3). In various embodiments, activity 604 can be performed after activities 601-603. In other embodiments, one or more of activities 601-603 can be omitted.

In many embodiments, method 600 can comprise activity 605 of identifying a restricted group of questions. The restricted group of questions can be similar or identical to the restricted group of questions described above with respect to system 300 (FIG. 3). In some embodiments, performing activity 605 can be similar or identical to identifying the restricted group of questions as described above with respect to system 300 (FIG. 3). In various embodiments, activity 605 can be performed after one or more of activities 601-604 and/or responsive to activity 604 being performed.

Figure 7:
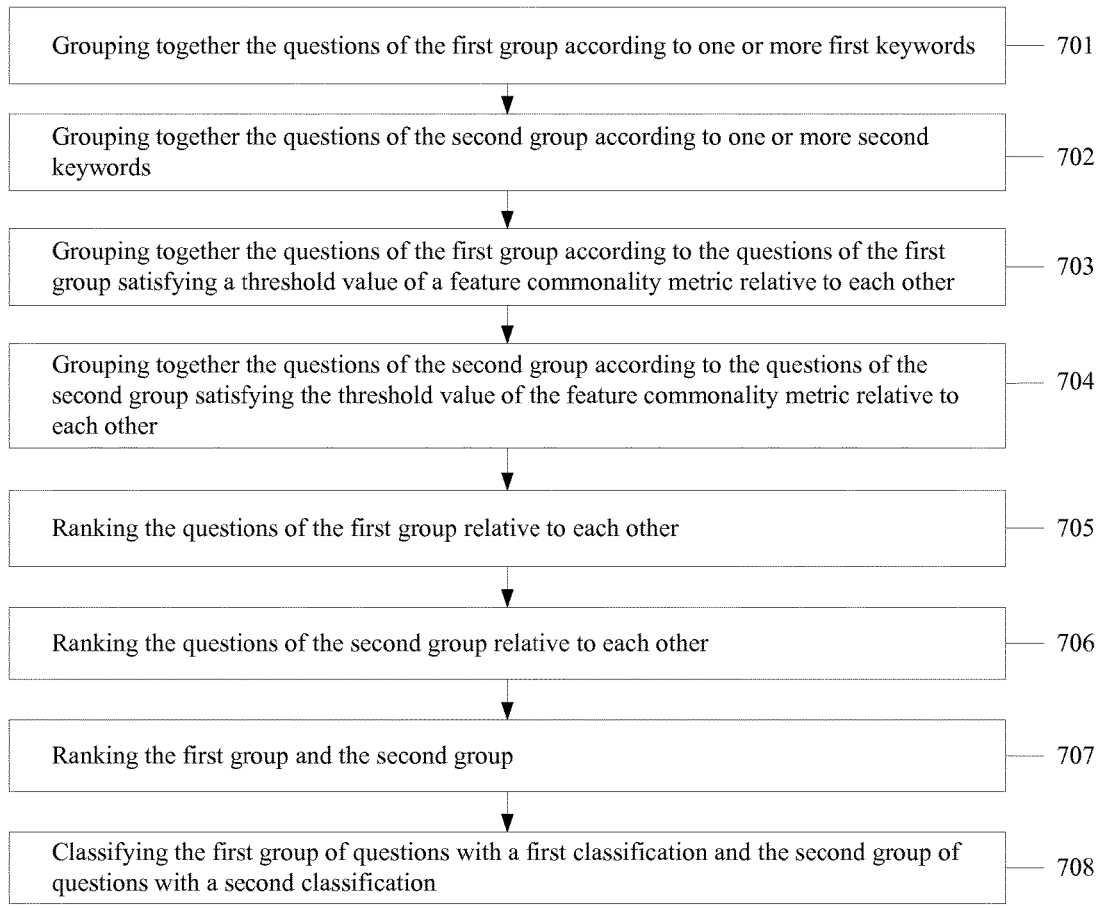
FIG. 7 illustrates a flow chart for an exemplary activity of transforming the restricted group of questions into a first group of questions and a second group of questions, according to the embodiment of FIG. 6.

In many embodiments, method 600 can comprise activity 606 of transforming the restricted group of questions into a first group of questions and a second group of questions. The first group of questions and/or the second group of questions each can be similar or identical to any sub-group of the multiple sub-groups of questions described above with respect to system 300 (FIG. 3). In some embodiments, performing activity 606 can be similar or identical to transforming the restricted group of questions into the multiple sub-groups of questions as described above with respect to system 300 (FIG. 3). In various embodiments, activity 606 can be performed after one or more of activities 601-605. In these or other embodiments, activity 606 can be performed responsive to activity 604 and/or activity 605 being performed. FIG. 7 illustrates an exemplary activity 606, according to the embodiment of FIG. 6.

For example, as shown in FIG. 7, in some embodiments, activity 606 can comprise activity 701 of grouping together the questions of the first group according to one or more first keywords. The first keyword(s) can be similar or identical to the one or more keywords described above with respect to transformation module 410 (FIG. 4). In some embodiments, performing activity 701 can be similar or identical to grouping together the questions of one of the multiple sub-groups according to one or more first keywords as described above with respect to system 300 (FIG. 3).

In these or other embodiments, activity 606 can comprise activity 702 of grouping together the questions of the second group according to one or more second keywords. The second keyword(s) can be similar or identical to the one or more keywords described above with respect to transformation module 410 (FIG. 4). In these or other embodiments, at least one of the second keyword(s) can be different than at least one of the first keyword(s). In further embodiments, performing activity 702 can be similar or identical to grouping together the questions of one of the multiple sub-groups according to one or more second keywords as described above with respect to system 300 (FIG. 3). In many embodiments, activity 702 can be performed when activity 701 is performed. In these embodiments, activity 702 can be performed before, after, or approximately simultaneously with activity 701.

In other embodiments, activity 606 can comprise activity 703 of grouping together the questions of the first group according to the questions of the first group satisfying a threshold value of a feature commonality metric relative to each other. The feature commonality metric and/or the threshold value can be similar or identical to the feature commonality metric and/or threshold value described above with respect to transformation module 410 (FIG. 4). In some embodiments, performing activity 703 can be similar or identical to grouping together the questions of one of the multiple sub-groups according to the questions of that sub-group satisfying a threshold value of a feature commonality metric relative to each other as described above with respect to system 300 (FIG. 3).

In these or other embodiments, activity 606 can comprise activity 704 of grouping together the questions of the second group according to the questions of the second group satisfying the threshold value of the feature commonality metric relative to each other. In some embodiments, performing activity 704 can be similar or identical to grouping together the questions of one of the multiple sub-groups according to the questions of that sub-group satisfying a threshold value of a feature commonality metric relative to each other as described above with respect to system 300 (FIG. 3). In these embodiments, the questions of the second group can be different than the questions of the first group. In many embodiments, activity 704 can be performed when activity 703 is performed. In these embodiments, activity 704 can be performed before, after, or approximately simultaneously with activity 703. In other embodiments, activities 703 and 704 can be omitted when activity 701 and 702 are performed, and vice versa.

In many embodiments, activity 606 can comprise activity 705 of ranking the questions of the first group relative to each other, such as, for example, according to relevance to the search query. In some embodiments, performing activity 705 can be similar or identical to ranking the questions of one of the multiple sub-groups relative to each other as described above with respect to system 300 (FIG. 3). In other embodiments, activity 705 can be omitted.

In these or other embodiments, activity 606 can comprise activity 706 of ranking the questions of the second group relative to each other, such as, for example, according to relevance to the search query. In some embodiments, performing activity 706 can be similar or identical to ranking the questions of one of the multiple sub-groups relative to each other as described above with respect to system 300 (FIG. 3). In other embodiments, activity 706 can be omitted, or it can be performed before activity 705.

In many embodiments, activity 606 can comprise activity 707 of ranking the first group and the second group, such as, for example, according to a quantity of the questions of the first group and a quantity of the questions of the second group. In some embodiments, performing activity 707 can be similar or identical to ranking the multiple sub-groups relative to each other as described above with respect to system 300 (FIG. 3). In other embodiments, activity 707 can be omitted.

In many embodiments, activity 606 can comprise activity 708 of classifying the first group of questions with a first classification and the second group of questions with a second classification. In some embodiments, performing activity 708 can be similar or identical to classifying the multiple sub-groups as described above with respect to system 300 (FIG. 3). In other embodiments, activity 708 can be omitted.

Referring now back to FIG. 6, in many embodiments, method 600 can comprise activity 607 of communicating to a user the first classification and the second classification. In some embodiments, performing activity 607 can be similar or identical to communicating to a user one or more of the classifications as described above with respect to system 300 (FIG. 3). For example, in these or other embodiments, performing activity 607 can comprise displaying to the user the first classification and the second classification. In various embodiments, activity 607 can be performed after one or more of activities 601-606. In these or other embodiments, activity 607 can be performed responsive to one or more of activities 604-606 being performed.

In many embodiments, method 600 can comprise activity 608 of communicating to the user the first group of questions and/or the second group of questions. In some embodiments, performing activity 608 can be similar or identical to communicating to a user one or more of the multiple sub-groups as described above with respect to system 300 (FIG. 3). For example, in these or other embodiments, performing activity 608 can comprise displaying to the user the first group of questions and/or the second group of questions. In various embodiments, activity 608 can be performed after one or more of activities 601-607. In some embodiments, activity 608 can be performed approximately simultaneously with activity 607. In further embodiments, activity 608 can be omitted.

In many embodiments, method 600 can comprise activity 609 of identifying answers to the questions of the restricted group. The answers to the questions of the restricted group can be similar or identical to the answers to the questions of the restricted group described above with respect to system 300 (FIG. 3). In some embodiments, performing activity 608 can be similar or identical to identifying answers to the questions of the restricted group as described above with respect to system 300 (FIG. 3). In various embodiments, activity 609 can be performed after one or more of activities 601-604 and/or responsive to activity 604 being performed. In some embodiments, activity 609 can be performed approximately simultaneously with activity 605 and/or as part of activity 605. In other embodiments, activity 609 can be omitted.

In many embodiments, method 600 can comprise activity 610 of transforming the answers to the questions of the restricted group into a first group of answers to the questions of the first group and a second group of answers to the questions of the second group. In some embodiments, performing activity 610 can be similar or identical to transforming the answers to the questions of the restricted group into multiple sub-groups of answers to the questions of the multiple sub-groups as described above with respect to system 300 (FIG. 3). In various embodiments, activity 610 can be performed after one or more of activities 601-604 and 609 and/or responsive to activity 604 being performed. In some embodiments, activity 610 can be performed approximately simultaneously with activity 606 and/or as part of activity 606. In other embodiments, activity 610 can be omitted.

In many embodiments, method 600 can comprise activity 611 of communicating to a user the first group of answers and the second group of answers. In some embodiments, performing activity 611 can be similar or identical to communicating to a user the multiple sub-groups of answers as described above with respect to system 300 (FIG. 3). In various embodiments, activity 611 can be performed after one or more of activities 601-604, 609, and 610 and/or responsive to activity 604 being performed. In some embodiments, activity 611 can be performed approximately simultaneously with activity 608 and/or as part of activity 608. In other embodiments, activity 611 can be omitted.

In some embodiments, method 600 can comprise activities similar or identical to activities 601-603, but with respect to answers of the questions of the unrestricted group. In many embodiments, these activities can be performed before, after, or approximately simultaneously with one or more of activities 601-603. In further embodiments, method 600 can comprise one or more activities of identifying at least one question of the first and/or second group of questions that is irrelevant to the search query, identifying at least one answer of the first and/or second group of questions that is irrelevant to the search query, identifying at least one of the first group or the second group of questions as being irrelevant to the search query, and/or identifying one of the first group or the second group of answers as being irrelevant to the search query. In other embodiments, one or more of these activities can be omitted.

In other embodiments, method 600 can be additionally implemented or alternatively implemented with one or more other types of media snippets (e.g., declarations, headlines, titles, etc.). For example, in these embodiments, method 600 can include one or more activities similar or identical to one or more of activities 601-608 but with respect to the other types of media snippets.

Having provided the above description of system 300 (FIG. 3) and method 600 (FIG. 6), other embodiments of systems and methods are also provided herein. Some embodiments can include systems similar to system 300 (FIG. 3) and/or methods similar to method 600 (FIG. 6). Some of these systems and methods can be centric to a user computer system and/or a user (e.g., operating the user computer system). The user computer system can be similar or identical to user computer system 304 (FIG. 3) and/or the user can be similar or identical to the user described above with respect to system 300 (FIG. 3).

In many embodiments, the system and methods provided herein can be implemented for search engine optimization and/or computer networking In further embodiments, the system and methods provided herein can provide improved search engine optimization and/or computer networking by facilitating navigation, review, and understanding of search content.

Although outlining search content has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-7 may be modified, and that the foregoing discussion of certain of these embodiments does not necessarily represent a complete description of all possible embodiments. For example, one or more of the activities of method 600 (FIG. 6) or one or more of the other methods described herein may include different activities and be performed by many different modules, in many different orders. As another example, the modules within central computer system 301 and/or user computer system(s) 303 in FIG. 3 can be interchanged or otherwise modified.

Generally, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
an input device;
an output device;
one or more processing modules; and
one or more non-transitory memory storage modules storing computer instructions configured to run on the one or more processing modules and perform acts of:
receiving a search query; and
responsive to receiving the search query:
identifying a restricted group of questions, questions of the restricted group of questions being relevant to the search query;
identifying answers to the questions of the restricted croup of questions;
transforming the restricted group of questions into a first group of questions and a second group of questions, the questions of the restricted group of questions comprising the questions of the first group of questions and the questions of the second group of questions;
grouping together the questions of the first group of questions according to the questions of the first group of questions each satisfying a threshold value of a feature commonality metric relative to each other;
grouping together the questions of the second group of questions according to the questions of the second group of questions each satisfying the threshold value of the feature commonality metric relative to each other;
classifying the first group of questions with a first classification and the second group of questions with a second classification;
communicating to a user the first classification and the second classification;
communicating to the user the answers to the questions of the restricted group of questions; and
omitting an answer to a question of the restricted group of questions from a communication to the user when no answer is identified to the question of the restricted croup of questions,
wherein:
the input device and the output device are configured to permit an operator of the system to manage the one or more processing modules and the one or more non-transitory memory storage modules;
the feature commonality metric is calculated using a divergence score and a convergence score;
the convergence score comprises at least one of:
a quantity of one or more words in common for at least two questions;
a difference in a number of words separating two or more words in common for at least two questions;
a difference in a quantity of words for at least two questions;
an order of words in common for at least two questions;
a grammatical type of one or more words in common for at least two questions;
a word choice of one or more words in common for at least two questions;
a number of characters of one or more words in common for at least two questions; or
a language of one or more words in common for at least two questions; and
the divergence score comprises at least one of:
a quantity of one or more words in common for at least two questions;
a difference in a number of words separating two or more words in common for at least two questions;
a difference in a quantity of words for at least two questions;
an order of words in common for at least two questions;
a grammatical type of one or more words in common for at least two questions;
a word choice of one or more words in common for at least two questions;
a number of characters of one or more words in common for at least two questions; or
a language of one or more words in common for at least two questions.

2. The system of claim 1 wherein the acts further comprise:
crawling one or more media sources to identify an unrestricted group of questions, questions of the unrestricted group of questions comprising the questions of the restricted group of questions;
indexing the questions of the unrestricted group of questions so that the questions of the unrestricted group of questions are searchable; and
storing the unrestricted group of questions at a question database.

3. The system of claim 2 wherein:
the one or more media sources comprise one or more web pages, the one or more web pages comprise one or more literary works, and the one or more literary works comprise the questions of the unrestricted group of questions.

4. The system of claim 2 wherein the acts further comprise:
ranking the first group of questions and the second group of questions relative to each other; and
communicating to the user the first classification and the second classification comprises displaying to the user the first classification and the second classification in a classification order corresponding to a group order in which the first group of questions and the second group of questions are ranked relative to each other.

5. A method comprising:
executing one or more first computer instructions configured to receive a search query;
and
responsive to executing the one or more first computer instructions:
executing one or more second computer instructions configured to identify a restricted group of questions, questions of the restricted group of questions being relevant to the search query;
executing one or more third computer instructions configured to identify answers to the questions of the restricted group of questions;
executing one or more fourth computer instructions configured to transform the restricted group of questions into a first group of questions and a second group of questions, the questions of the restricted group of questions comprising the questions of the first group of questions and the questions of the second group of questions;
executing one or more fifth computer instructions configured to group together the questions of the first group of questions according to the questions of the first group of questions each satisfying a threshold value of a feature commonality metric relative to each other;

executing one or more sixth computer instructions configured to group together the questions of the second group of questions according to the questions of the second group of questions each satisfying the threshold value of the feature commonality metric relative to each other;

executing one or more seventh computer instructions configured to classify the first group of questions with a first classification and the second group of questions with a second classification;

executing one or more eighth computer instructions configured to communicate to a user the first classification and the second classification;

executing one or more ninth computer instructions configured to communicate to the user the answers to the questions of the restricted group of questions; and executing one or more tenth computer instructions configured to omit an answer to a question of the restricted group of questions from a communication to the user when no answer is identified to the question of the restricted group of questions, wherein:
the one or more first computer instructions, the one or more second computer instructions, the one or more third computer instructions, the one or more fourth computer instructions, the one or more fifth computer instructions, the one or more sixth computer instructions, the one or more seventh computer instructions, the one or more eighth computer instructions, the one or more ninth computer instructions, and the one or more tenth computer instructions are configured to run at one or more processing modules and configured to be stored at one or more non-transitory memory storage modules;

the feature commonality metric is calculated using a divergence score and a convergence score;

the convergence score comprises at least one of:
a quantity of one or more words in common for at least two questions;
a difference in a number of words separating two or more words in common for at least two questions;
a difference in a quantity of words for at least two questions;
an order of words in common for at least two questions;
a grammatical type of one or more words in common for at least two questions;
a word choice of one or more words in common for at least two questions;
a number of characters of one or more words in common for at least two questions; or
a language of one or more words in common for at least two questions; and the divergence score comprises at least one of:
a quantity of one or more words in common for at least two questions;
a difference in a number of words separating two or more words in common for at least two questions;
a difference in a quantity of words for at least two questions;
an order of words in common for at least two questions;
a grammatical type of one or more words in common for at least two questions;
a word choice of one or more words in common for at least two questions;
a number of characters of one or more words in common for at least two questions; or
a language of one or more words in common for at least two questions.

6. The method of claim 5 wherein:
executing the one or more fourth computer instructions comprises:
executing one or more eleventh computer instructions configured to group together the questions of the first group of questions according to the questions of the first group of questions each being associated with one or more first keywords; and
executing one or more twelfth computer instructions configured to group together the questions of the second group of questions according to the questions of the second group of questions each being associated with one or more second keywords.

7. The method of claim 5 further comprising:
executing one or more eleventh computer instructions configured to crawl one or more media sources to identify an unrestricted group of questions, questions of the unrestricted group of questions comprising the questions of the restricted group of questions;
executing one or more twelfth computer instructions configured to index the questions of the unrestricted group of questions so that the questions of the unrestricted group of questions are searchable; and
executing one or more thirteenth computer instructions configured to store the unrestricted group of questions at a question database;
wherein:
the one or more eleventh computer instructions, the one or more twelfth computer instructions, and the one or more thirteenth computer instructions are configured to run at the one or more processing modules and configured to be stored at the one or more non-transitory memory storage modules.

8. The method of claim 7 wherein:
the one or more media sources comprise one or more literary works, and the one or more literary works comprise the questions of the unrestricted group of questions.

9. The method of claim 7 wherein:
the one or more media sources comprise one or more web pages, and the one or more web pages comprise the questions of the unrestricted group of questions.

10. The method of claim 5 wherein:
executing the one or more fourth computer instructions comprises:
executing one or more eleventh computer instructions configured to rank the questions of the first group of questions relative to each other; and
executing one or more twelfth computer instructions configured to rank the questions of the second group of questions relative to each other.

11. The method of claim 10 wherein:
executing the one or more eleventh computer instructions comprises:
executing one or more thirteenth computer instructions configured to rank the questions of the first group of questions relative to each other according to a relevance to the search query;

and
executing the one or more twelfth computer instructions comprises:
   executing one or more fourteenth computer instructions configured to rank the questions of the second group of questions relative to each other according to the relevance to the search query.

12. The method of claim 5 wherein:
executing the one or more fourth computer instructions comprises:
   executing one or more eleventh computer instructions configured to rank the first group of questions and the second group of questions relative to each other.

13. The method of claim 12 wherein:
executing the one or more eleventh computer instructions comprises:
   executing one or more twelfth computer instructions configured to rank the first group of questions and the second group of questions according to a quantity of the questions of the first group of questions and a quantity of the questions of the second group of questions.

14. The method of claim 5 wherein:
the first classification comprises at least one of a first name or a first score; and
the second classification comprises at least one of a second name or a second score.

15. The method of claim 5 wherein:
executing the one or more eighth computer instructions comprises:
   executing one or more eleventh computer instructions configured to display to the user the first classification and the second classification.

16. The method of claim 5 further comprising:
executing the one or more fourth computer instructions comprises executing one or more twelfth computer instructions configured to transform the answers to the questions of the restricted group of questions into a first group of answers to the questions of the first group of questions and a second group of answers to the questions of the second group of questions, the answers to the questions of the restricted group of questions comprising the answers to the questions of the first group of questions and the answers to the questions of the second group of questions, the first group of questions comprising the first group of answers, and the second group of questions comprising the second group of answers;
wherein:
   the one or more twelfth computer instructions are configured to run at the one or more processing modules and configured to be stored at the one or more non-transitory memory storage modules.

17. The method of claim 5 further comprising:
executing one or more eleventh computer instructions configured to communicate to the user at least one of the first group of questions or the second group of questions.

18. The method of claim 5 further comprising:
executing one or more eleventh computer instructions configured to crawl one or more media sources to identify an unrestricted group of questions, the questions of the unrestricted group of questions comprising the questions of the restricted group of questions;
executing one or more twelfth computer instructions configured to index the questions of the unrestricted group of questions so that the questions of the unrestricted group of questions are searchable; and
executing one or more thirteenth computer instructions configured to store the unrestricted group of questions at a question database;
wherein:
   executing the one or more fourth computer instructions comprises:
      executing one or more fourteenth computer instructions configured to rank the questions of the first group of questions relative to each other;
      executing one or more fifteenth computer instructions configured to rank the questions of the second group of questions relative to each other; and
      executing one or more sixteenth computer instructions configured to rank the first group of questions and the second group of questions relative to each other;
   executing the one or more eighth computer instructions comprises:
      executing one or more seventeenth computer instructions configured to display to the user the first classification and the second classification;
   the one or more media sources comprise one or more web pages, the one or more web pages comprise one or more literary works, and the one or more literary works comprise the questions of the unrestricted group of questions;
and
the one or more eleventh computer instructions, the one or more twelfth computer instructions and the one or more thirteenth computer instructions are configured to run at the one or more processing modules and configured to be stored at the one or more non-transitory memory storage modules.

19. A method comprising:
executing one or more first computer instructions configured to receive a search query;
and
responsive to executing the one or more first computer instructions:
   executing one or more second computer instructions configured to identify a restricted group of text snippets, text snippets of the restricted group of text snippets being relevant to the search query;
   executing one or more third computer instructions configured to identify answers to the text snippets of the restricted group of text snippets;
   executing one or more fourth computer instructions configured to transform the restricted group of text snippets into a first group of text snippets and a second group of text snippets, the text snippets of the restricted group of text snippets comprising the text snippets of the first group of text snippets and the text snippets of the second group of text snippets;
   executing one or more fifth computer instructions configured to group together the text snippets of the first group of text snippets according to the text snippets of the first group of text snippets each satisfying a threshold value of a feature commonality metric relative to each other;
   executing one or more sixth computer instructions configured to group together the text snippets of the second group of text snippets according to the text snippets of the second group of text snippets each satisfying the threshold value of the feature commonality metric relative to each other;

executing one or more seventh computer instructions configured to classify the first group of text snippets with a first classification and the second group of text snippets with a second classification;

executing one or more eighth computer instructions configured to communicate to a user the first classification and the second classification;

executing one or more ninth computer instructions configured to communicate to the user the answers to the text snippets of the restricted group of text snippets; and executing one or more tenth computer instructions configured to omit an answer to a text snippet of the restricted group of text snippets from a communication to the user when no answer is identified to the text snippet of the restricted group of text snippets, wherein:

the one or more first computer instructions, the one or more second computer instructions, the one or more third computer instructions, the one or more fourth computer instructions, the one or more fifth computer instructions, the one or more sixth computer instructions, the one or more seventh computer instructions, the one or more eighth computer instructions, the one or more ninth computer instructions, and the one or more tenth computer instructions are configured to run at one or more processing modules and configured to be stored at one or more non-transitory memory storage modules;

the feature commonality metric is calculated using a divergence score and a convergence score;

the convergence score comprises at least one of:
a quantity of one or more words in common for at least two text snippets;
a difference in a number of words separating two or more words in common for at least two text snippets;
a difference in a quantity of words for at least two text snippets;
an order of words in common for at least two text snippets;
a grammatical type of one or more words in common for at least two text snippets;
a word choice of one or more words in common for at least two text snippets;
a number of characters of one or more words in common for at least two text snippets; or
a language of one or more words in common for at least two text snippets; and the divergence score comprises at least one of:
a quantity of one or more words in common for at least two text snippets;
a difference in a number of words separating two or more words in common for at least two text snippets;
a difference in a quantity of words for at least two text snippets;
an order of words in common for at least two text snippets;
a grammatical type of one or more words in common for at least two text snippets;
a word choice of one or more words in common for at least two text snippets;
a number of characters of one or more words in common for at least two text snippets; or
a language of one or more words in common for at least two text snippets.

20. The method of claim 19 further comprising:

executing one or more eleventh computer instructions configured to crawl one or more media sources to identify an unrestricted group of text snippets, text snippets of the unrestricted group of text snippets comprising the text snippets of the restricted group of text snippets;

executing one or more twelfth computer instructions configured to index the text snippets of the unrestricted group of text snippets so that the text snippets of the unrestricted group of text snippets are searchable; and executing one or more thirteenth computer instructions configured to store the unrestricted group of text snippets at a search content database;

wherein:

the one or more media sources comprise one or more web pages, the one or more web pages comprise one or more literary works, and the one or more literary works comprise the text snippets of the unrestricted group of text snippets; and the one or more eleventh computer instructions, the one or more twelfth computer instructions, and the one or more thirteenth computer instructions are configured to run at the one or more processing modules and configured to be stored at the one or more non-transitory memory storage modules.

* * * * *